(12) United States Patent
Takahashi et al.

(10) Patent No.: US 9,747,437 B2
(45) Date of Patent: Aug. 29, 2017

(54) OUTPUT CONTROL APPARATUS, COMPUTER-READABLE MEDIUM FOR STORING PROGRAM FOR OUTPUT CONTROL APPARATUS, OUTPUT CONTROL METHOD, AND OUTPUT CONTROL SYSTEM

(71) Applicant: DIGITAL ARTS INC., Tokyo (JP)

(72) Inventors: Noriyuki Takahashi, Tokyo (JP); Toshio Dogu, Tokyo (JP)

(73) Assignee: DIGITAL ARTS INC., Tokyo (JP)

( * ) Notice: Subject to any disclaimer, the term of this patent is extended or adjusted under 35 U.S.C. 154(b) by 0 days.

(21) Appl. No.: 13/889,359

(22) Filed: May 8, 2013

(65) Prior Publication Data

US 2013/0247195 A1 Sep. 19, 2013

Related U.S. Application Data

(63) Continuation of application No. PCT/JP2011/006208, filed on Nov. 7, 2011.

(30) Foreign Application Priority Data

Nov. 9, 2010 (JP) .................................. 2010-251335

(51) Int. Cl.
*G06F 21/00* (2013.01)
*G06F 21/52* (2013.01)
(Continued)

(52) U.S. Cl.
CPC .............. *G06F 21/52* (2013.01); *G06F 21/56* (2013.01); *H04L 63/1416* (2013.01)

(58) Field of Classification Search
CPC ........... G06F 21/00; G06F 21/52; G06F 21/56
See application file for complete search history.

(56) References Cited

U.S. PATENT DOCUMENTS 8,572,759 B2 * 10/2013 Nagoya ............... H04L 63/0263
705/51
8,713,644 B2 * 4/2014 Krishna et al. .................. 726/4
(Continued)

FOREIGN PATENT DOCUMENTS

JP 2003-303118 A 10/2003
JP 2004-78648 A 3/2004
(Continued)

OTHER PUBLICATIONS

International Search Report for International application No. PCT/JP2011/006208; dated Jan. 17, 2012.
(Continued)

*Primary Examiner* — Beemnet Dada

(57) ABSTRACT

Provided is an output section that outputs data to outside; a condition storage section that stores an abnormal condition showing at least one of a characteristic of data to be outputted from the output section by means of malicious software and a characteristic of an operational pattern of the output section that results when the malicious software outputs data; and an output control section that prohibits output of data when at least one of a characteristic of data to be outputted from the output section and a characteristic of an operational pattern of the output section satisfies the abnormal condition.

20 Claims, 9 Drawing Sheets

(51) Int. Cl.
*G06F 21/56* (2013.01)
*H04L 29/06* (2006.01)

(56) References Cited

U.S. PATENT DOCUMENTS

| | | | |
|---|---|---|---|
| 2006/0179005 A1* | 8/2006 | Li et al. | 705/64 |
| 2006/0236392 A1 | 10/2006 | Thomas et al. | |
| 2006/0282890 A1 | 12/2006 | Gruper | |
| 2008/0307091 A1* | 12/2008 | Sakamaki et al. | 709/225 |
| 2009/0187989 A1* | 7/2009 | Kim et al. | 726/23 |
| 2009/0300768 A1* | 12/2009 | Krishnamurthy et al. | 726/26 |
| 2010/0071063 A1* | 3/2010 | Wang et al. | 726/23 |

FOREIGN PATENT DOCUMENTS

| | | |
|---|---|---|
| JP | 2008-129707 A | 6/2008 |
| JP | 2008-276457 A | 11/2008 |
| JP | 2009-507271 A | 2/2009 |
| JP | 2009-514095 A | 4/2009 |
| JP | 2009-140472 A | 6/2009 |
| JP | 2009-151751 A | 7/2009 |
| JP | 2010-511951 A | 4/2010 |
| WO | 2008/023423 A1 | 2/2008 |
| WO | 2010100262 A2 | 9/2010 |

OTHER PUBLICATIONS

International Preliminary Report on Patentability for International application No. PCT/JP2011/006208.

Akira Yonahara, A Consideration of Spyware Detection using Traffic Analysis, Electronics, Information and Communication Engineers Technical report, Institute of Electronics, Information and Communication Engineers Jul. 14, 2005, vol. 105, No. 192, pp. 29.

Seichiro Mizoguchi, Inplementation and Evaluation of Bot Detection Based on Data Transmission Intervals, multimedia, Distributed, Cooperative and Mobile (DICOMO2010) Symposium Information Processing Society Symposium Series [CD-ROM], Institute of Information Processing Society, Jun. 30, 2010, vol. 2010, No. 1, pp. 502-503.

Office Action issued for counterpart Japanese Application 2010-251335, issued by the Japanese Patent Office dated Jan. 13, 2015.

Extended European Search Report for European Patent Application No. 11839834.6, issued by the European Patent Office dated Dec. 20, 2016.

* cited by examiner

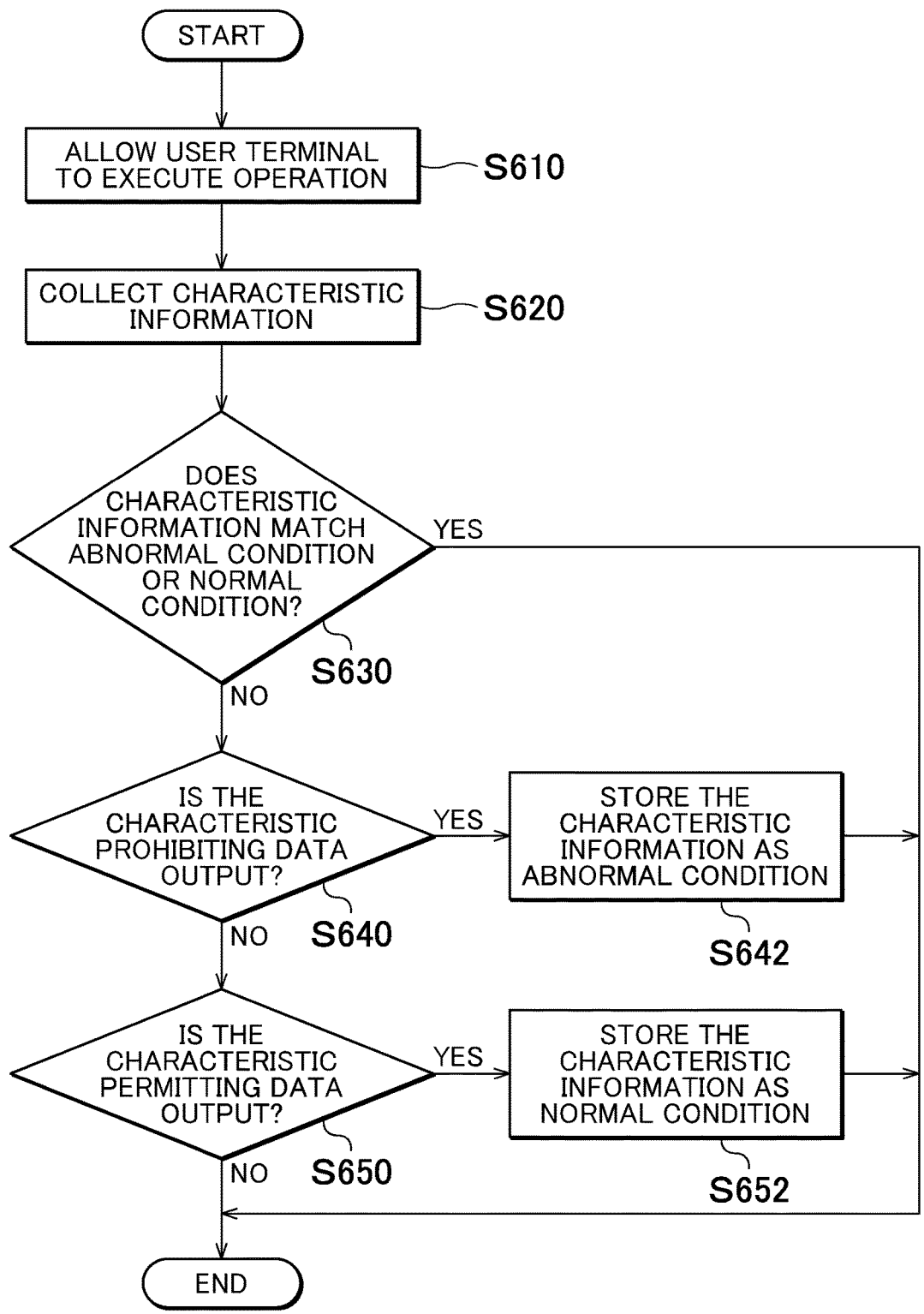
F I G . 6

OUTPUT CONTROL APPARATUS, COMPUTER-READABLE MEDIUM FOR STORING PROGRAM FOR OUTPUT CONTROL APPARATUS, OUTPUT CONTROL METHOD, AND OUTPUT CONTROL SYSTEM

The contents of the following Japanese patent application are incorporated herein by reference: No. 2010-251335 filed on Nov. 9, 2010. The contents of the following PCT application are incorporated herein by reference: No. PCT/JP2011/006208 filed on Nov. 7, 2011.

BACKGROUND

1. Technical Field

The present invention relates to an output control apparatus, a computer-readable medium for storing a program for an output control apparatus, an output control method, and an output control system.

2. Related Art

When malware such as computer viruses and spywares invade information processing apparatuses, they may transmit data stored in the information processing apparatuses to outside. Conventionally, anti-virus programs preventing invasion of malware into information processing apparatuses are known as countermeasures against malware. For example, please refer to the following patent document No. 1-No. 5.

Patent Document 1: Japanese Patent Application Publication No. 2003-303118
Patent Document 2: Japanese Patent Application Publication No. 2010-511951
Patent Document 3: Japanese Patent Application Publication No. 2009-514095
Patent Document 4: Japanese Patent Application Publication No. 2009-507271
Patent Document 5: Japanese Patent Application Publication No. 2009-151751

However, recent years have seen increase of new types of malware. Therefore, complete prevention of malware invasion is becoming difficult. In addition, it is becoming more troublesome to manage anti-virus programs. Therefore, it is an object of an aspect of the innovations herein to provide an output control apparatus, a computer-readable medium for storing a program for an output control apparatus, an output control method, and an output control system, which are capable of overcoming the above drawbacks accompanying the related art. The above and other objects can be achieved by combinations described in the claims.

SUMMARY

According to a first aspect of the present invention, provided is an output control apparatus including: an output section that outputs data to outside; a condition storage section that stores an abnormal condition showing at least one of a characteristic of data to be outputted from the output section by means of malicious software and a characteristic of an operational pattern of the output section that results when the malicious software outputs data; and an output control section that prohibits output of data when at least one of a characteristic of data to be outputted from the output section and a characteristic of an operational pattern of the output section satisfies the abnormal condition. In the above-explained control apparatus, the abnormal condition may include at least one of an abnormal data condition showing a characteristic of data to be outputted from the output section by means of the malicious software, and an abnormal operational condition showing a characteristic of an operational pattern of the output section that results when the malicious software outputs data.

In the above-explained control apparatus, the condition storage section may further store a normal condition showing at least one of a characteristic of data to be outputted from the output section by means of software other than the malicious software and a characteristic of an operational pattern of the output section that results when software other than the malicious software outputs data, and the output control section may permit output of the data when at least one of the characteristic of the data to be outputted from the output section and the characteristic of the operational pattern of the output section satisfies the normal condition. In the above-explained control apparatus, the normal condition may include at least one of a normal data condition showing a characteristic of data to be outputted from the output section by means of software other than the malicious software, and a normal operational condition showing a characteristic of an operational pattern of the output section that results when software other than the malicious software outputs data.

In the above-explained control apparatus, the output control section may inquire a user whether to output the data when the characteristic of the data to be outputted from the output section does not satisfy either the abnormal condition or the normal condition. In the above-explained control apparatus, the output control section may inquire a user whether to output the data when the characteristic of the operational pattern of the output section does not satisfy either the abnormal condition or the normal condition. In the above-explained control apparatus, the output control section may permit output of the data when having received a user instruction to permit output of data.

According to a second aspect of the present invention, provided is a computer-readable medium storing therein a program for an output control apparatus. The program may cause a computer to function as the output control apparatus explained above.

According to a third aspect of the present invention, provided is a output control method including: storing, in a condition storage section, an abnormal condition showing at least one of a characteristic of data to be outputted from an output section by means of malicious software and a characteristic of an operational pattern of the output section that results when the malicious software outputs data; and comparing, with the abnormal condition, at least one of a characteristic of data to be outputted from the output section and a characteristic of an operational pattern of the output section, and when at least one of the characteristic of the data to be outputted from the output section and the characteristic of the operational pattern of the output section satisfies the abnormal condition, prohibiting output of the data.

According to a fourth aspect of the present invention, provided is a output control system including: a server; and a terminal that exchanges information with the server via a communication line, where the terminal includes: an output section that outputs data to outside; and a characteristic information collecting section that collects characteristic information showing at least one of a characteristic of data to be outputted from the output section and a characteristic of an operation of the output section, and transmits the characteristic information to the server, and the server includes: a condition storage section that stores an abnormal condition showing at least one of a characteristic of data to be outputted from the output section by means of malicious software and a characteristic of an operation of the output section that results when the malicious software outputs data; and a deciding section that receives the characteristic information, decides to prohibit output of the data when the characteristic information satisfies the abnormal condition, and notifies the output section of the decision, and the output section does not output the data to outside when having received the decision to prohibit the output of the data.

The summary clause does not necessarily describe all necessary features of the embodiments of the present invention. The present invention may also be a sub-combination of the features described above.

BRIEF DESCRIPTION OF THE DRAWINGS

FIG. 6 schematically shows an exemplary condition collecting method.

DESCRIPTION OF EXEMPLARY EMBODIMENTS

Figure 1:
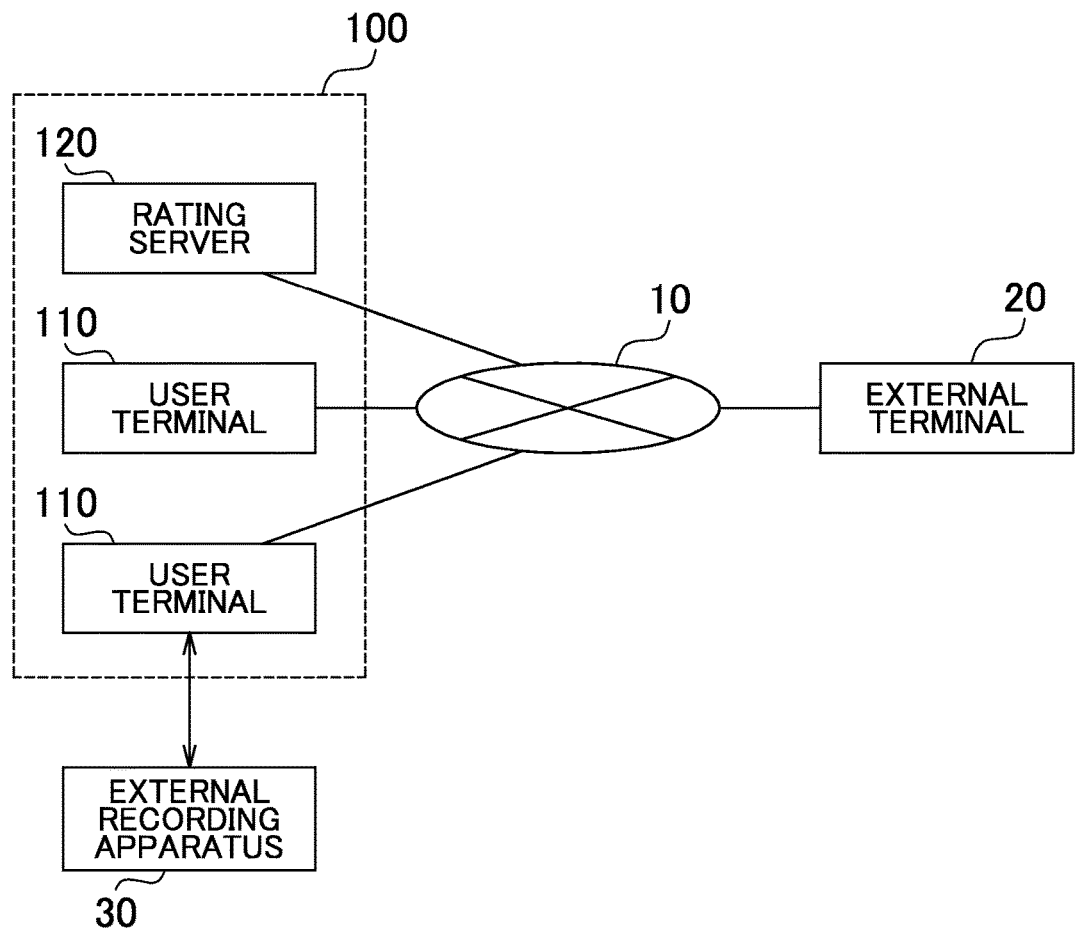
FIG. 1 schematically shows an exemplary system configuration of an output control system 100.

Hereinafter, an embodiment of the present invention will be described. The embodiment does not limit the invention according to the claims, and all the combinations of the features described in the embodiments are not necessarily essential to means provided by aspects of the invention. The embodiment(s) will be described below with reference to the drawings. In the drawings, the same or similar portions may be assigned the same reference numerals, to omit the overlapping explanations.

FIG. 1 schematically shows an exemplary system configuration of an output control system 100. FIG. 1 shows the output control system 100 together with a communication line 10, an external terminal 20, and an external recording apparatus 30. The output control system 100 includes a user terminal 110 and a rating server 120. The user terminal 110 may be an example of a terminal. The rating server 120 may be an example of a server.

The communication line 10 may be the Internet, a dedicated line, or a wireless packet communication network. The external terminal 20 may be any apparatus that can exchange information with the user terminal 110 via the communication line 10, and may be a server that manages a Web page browsable by Web browser software, or a personal computer, a mobile phone, or a mobile terminal, or a wireless terminal in which the Web browser software is incorporated. The external terminal 20 may be a virtual server or a cloud system. The external recording apparatus 30 may be connected to the user terminal 110 to exchange information with the user terminal 110. The external recording apparatus 30 may be a recording apparatus or a recording medium such as a hard disk, a CD-ROM, an IC card, a flash memory. The external recording apparatus 30 may be a recording apparatus or a recording medium virtualized or structured as a cloud system.

The user terminal 110 exchanges information with the rating server 120 via the communication line 10. The user terminal 110 may be a terminal authenticated by the rating server 120. The rating server 120 may authenticate the user terminal 110 using unique information such as a serial ID. The user terminal 110 may exchange information with the external terminal 20 not included in the output control system 100. The user terminal 110 may exchange information with the external recording apparatus 30 not included in the output control system 100.

The user terminal 110 may be a system or a controller dedicated to a certain purpose, or may be a general-purpose information processing apparatus such as a personal computer. The user terminal 110 may be a personal computer, a mobile phone, or a mobile terminal, or a wireless terminal in which the Web browser software is incorporated.

When attempting to output data to the external terminal 20 or to the external recording apparatus 30, the user terminal 110 judges whether to output the data. The user terminal 110 may make the judgment whether to output the data, based on at least one of the characteristic of the data to be outputted when the user terminal 110 is infected with malware and the characteristic of the operational pattern that results when the user terminal 110 is infected with malware.

Malware may be software or a code such as computer virus, worm, backdoor, KeyLogger, Trojan code, macro virus, boot sector virus, script virus, crimeware, scareware, spyware, malicious adware, and misleading application. Malware may be an example of malicious software. The characteristic of the data to be outputted when the user terminal 110 is infected with malware may be an example of the characteristic of the data to be outputted by malicious software. The characteristic of the operational pattern that results when the user terminal 110 is infected with malware may be an example of the characteristic of the operational pattern of malicious software.

When having judged to prohibit outputting of data, the user terminal 110 does not output the data to the external terminal 20 or to the external recording apparatus 30. Accordingly, even when the user terminal 110 is infected with malware, the data stored in the user terminal 110 will be prevented from being outputted to outside, and fraudulent mail transmission from the user terminal 110 to outside will be restrained. For example, the stated arrangement can prevent such an event that malicious software is downloaded from the external terminal 20 to the user terminal 110 when the user terminal 110 is browsing contents provided by the external terminal 20 and information stored in the user terminal 110 is downloaded to outside without noticed by the user or without any permission by the user.

As an exemplary method to judge whether to output the data, a character string possibly included in data that should be prohibited from outputting is determined in advance, and data output is prohibited when the data includes the predetermined character string, by comparing the character string included in the data to be outputted with the predetermined character string. However, if the judgment as to whether to output the data is based on at least one of the characteristic of the data to be outputted when the user terminal 110 is infected with malware and the characteristic of the operational pattern when the user terminal 110 is infected with malware in, the burden on the system operation would be greatly alleviated.

The rating server 120 may exchange information with a plurality of user terminals 110 via the communication line 10. The rating server 120 may be a server trusted by the user terminals 110. The user terminals 110 and the rating server 120 may ensure reliability by using the certificate authority of the SSL (Secure Sockets Layer protocol). The rating server 120 may be constituted by a single server, or may be constituted by a plurality of servers. The rating server 120 may be a virtual server or a cloud system. The rating server 120 may be a system or a controller dedicated to a certain purpose, or a general-purpose information processing apparatus such as a personal computer.

The rating server 120 may collect, from a plurality of user terminals 110, at least one of the characteristic of the data to be outputted when they are infected with malware and the characteristic of the operational pattern when they are infected with malware. The rating server 120 may store the collected characteristics as abnormal conditions showing the characteristics which triggers prohibition of the outputting of data. The rating server 120 may notify each of the plurality of user terminals 110 of the abnormal conditions.

The rating server 120 may collect, from a plurality of user terminals 110, at least one of the characteristic of the data to be outputted when they are not infected with malware and the characteristic of the operational pattern when they are not infected with malware. The rating server 120 may store the collected characteristics as normal conditions showing the characteristics which triggers permission of the outputting of data. The rating server 120 may notify each of the plurality of user terminals 110 of the normal conditions.

Figure 2:
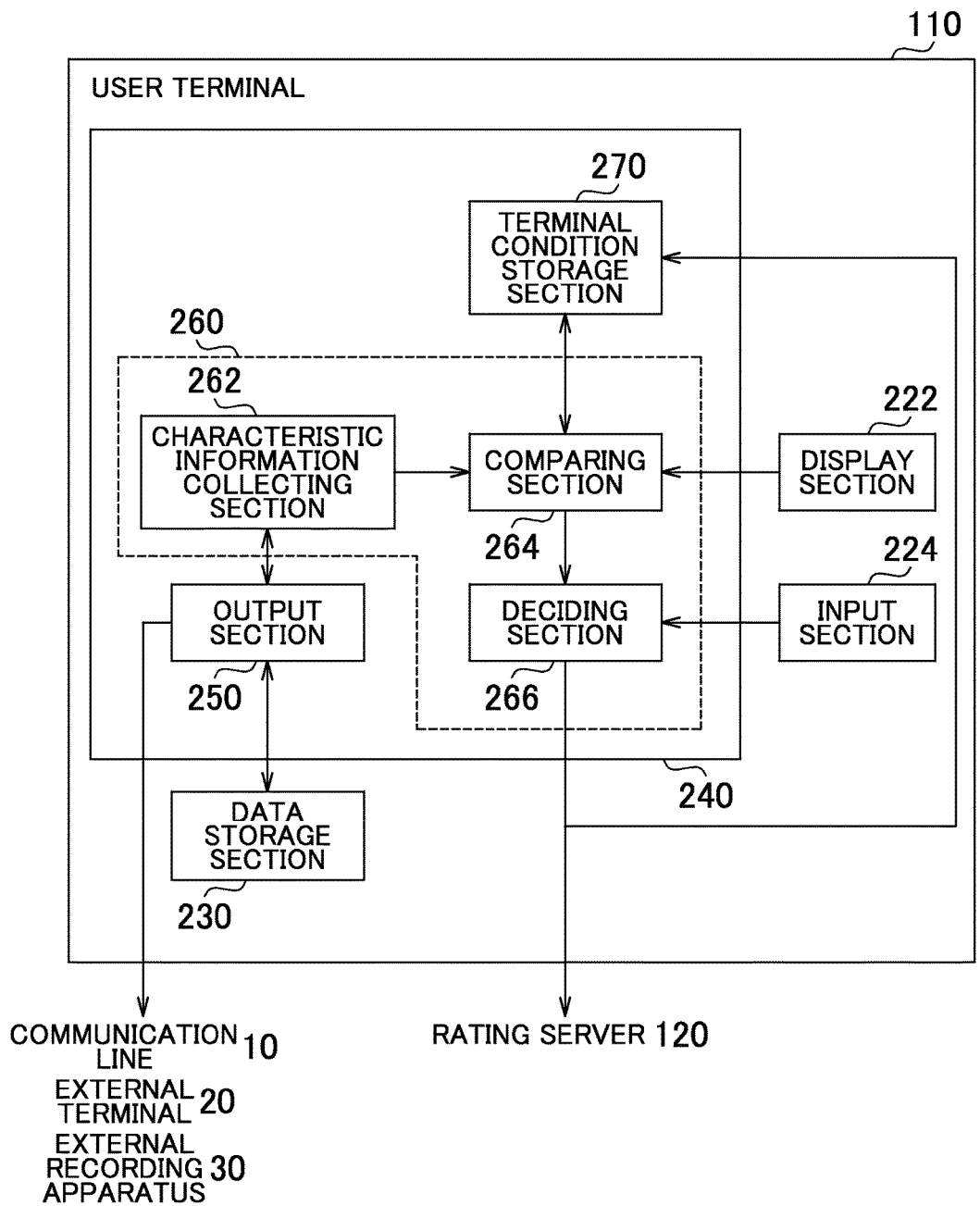
FIG. 2 schematically shows an exemplary system configuration of a user terminal 110.

FIG. 2 schematically shows an exemplary system configuration of a user terminal 110. The user terminal 110 includes a display section 222, an input section 224, a data storage section 230, and an output control apparatus 240. The output control apparatus 240 may include an output section 250, an output control section 260, and a terminal condition storage section 270. The terminal condition storage section 270 may be an example of a condition storage section The display section 222 may display the information obtained from the output control apparatus 240. The display section 222 may be a display apparatus such as a liquid-crystal display, an organic EL display, a CRT display, or a printer or a speaker. The input section 224 may receive an input from a user, and notifies the output control apparatus 240 thereof. The input section 224 may be an input apparatus such as a keyboard, a mouse, a touch panel, a microphone, a character recognizing apparatus such as OCR, and a voice recognizing apparatus.

The data storage section 230 stores data. The data storage section 230 may be a memory such as a ROM, RAM, and a cache memory. The data storage section 230 may be a recording apparatus or a recording medium such as a hard disk, a CD-ROM, an IC card, and a flash memory. The data storage section 230 may be a recording apparatus or a recording medium that is virtualized or structured as a cloud system.

The output control apparatus 240 outputs the data stored in the data storage section 230 to outside of the output control system 100. When attempting to output data to the external terminal 20 or to the external recording apparatus 30, the output control apparatus 240 judges whether to output the data. The output control apparatus 240 may make the judgment whether to output the data, based on at least one of the characteristic of the data to be outputted when the user terminal 110 is infected with malware and the characteristic of the operational pattern when the user terminal 110 is infected with malware.

The output control apparatus 240 may record the operational status of the output control apparatus 240. The output control apparatus 240 may record the log of such as the chronological sequence data regarding decision of prohibition or permission of output, the identification numerals of the collected pieces characteristic information, the access destination of the user terminal 110, and the source of access to the user terminal 110. The output control apparatus 240 may statistically analyze the log. The output control apparatus 240 may display, to the user, data resulting from statistically analyzing the log. The user or the output control apparatus 240 may associate the characteristic of the data to be outputted and the characteristic of the operational pattern, with the information on whether to output the data, based on the data resulting from statistically analyzing the log.

The output control apparatus 240 as well as each section of the output control apparatus 240 may be realized either by hardware or by software. The output control apparatus 240 may be a system dedicated to each purpose, or a general-purpose information processing apparatus such as a personal computer. The dedicated system or the information processing apparatus may be constituted by a single computer, or may be constituted by a plurality of computers distributed on a network.

A computer may function as the output control apparatus 240 upon execution of a program. The output control apparatus 240 may be realized by activating the software defining the operation of each section of the output control apparatus 240 in an information processing apparatus having a general configuration that includes a storage apparatus, an output apparatus, an input apparatus, and a data processing apparatus including a CPU, a ROM, a RAM, a communication interface or the like.

The output section 250 may output, to outside, the data stored in the data storage section 230 based on the instruction of the output control section 260. Upon reception of an instruction from the output control section 260 prohibits output of data, the output section 250 does not output the data stored in the data storage section 230 to outside. Upon reception of an instruction from the output control section 260 permits output of data, the output section 250 outputs the data stored in the data storage section 230 to outside.

The output control section 260 controls the output section 250. The output control section 260 prohibits or permits output of data from the output section 250. The output control section 260 may include a characteristic information collecting section 262, a comparing section 264, and a deciding section 266.

The characteristic information collecting section 262 collects characteristic information showing at least one of the characteristic of the data outputted from the output section 250, and the characteristic of the operational pattern of the output section 250. The characteristic information collecting section 262 may monitor the data which the output section 250 attempts to output, and collect the characteristic information showing the characteristic of the data outputted from the output section 250. The characteristic information collecting section 262 may collect, as characteristic information, whether the data which the output section 250 attempts to output complies with the RFC (Request for Comments).

The characteristic information collecting section 262 monitors the portion of the data which the output section 250 attempts to output that has a high possibility of being changed between when the user terminal 110 is infected with malware and when the user terminal 110 is not infected with malware, thereby collecting the information of the portion as the characteristic information. The characteristic information collecting section 262 may collect the hash value of the information of the portion as the characteristic information. Accordingly, the collected characteristic information will not contain personal information.

Some examples of the portion of the data that has a high possibility of being changed between when the user terminal 110 is infected with malware and when the user terminal 110 is not infected with malware are the header of the data which the output section 250 attempts to output, the process name of the process that is about to output the data, and the URL, the domain name, and the IP address of the site which the user terminal 110 is about to communicate. Note that the character strings may not be readable as binary data.

The characteristic information collecting section 262 may determine the portion of the data that has a high possibility of being changed between when the user terminal 110 is infected with malware and when the user terminal 110 is not infected with malware, by analyzing the operation of a commercially available application or the like in advance. The characteristic information collecting section 262 may determine, as the portion of the data that has a high possibility of being changed, the field that is not likely to be used often when software other than malicious software is operated.

The characteristic information collecting section 262 may monitor the portion that has a high possibility of being changed, thereby collecting the characteristic information of the data which the output section 250 attempts to output. The characteristic information collecting section 262 may collect the characteristic of the data without searching the main texts of the data which the output section 250 attempts to output, for protecting the user's privacy.

The characteristic information collecting section 262 may monitor the operation of the output section 250, thereby collecting the characteristic information showing the characteristic of the operational pattern of the output section 250. Some examples of the characteristics of the operational pattern are whether the user has accepted or not when the output section 250 tries to execute a certain operation, the output destination of the data, whether the URL, the domain name, or the IP address of the site in communication matches the URL, the domain name, or the IP address of the site that is the intended destination of the outputted data. The characteristic information collecting section 262 may judge that it is likely abnormal when the degree of discrepancy between the character string included in the domain name of the connection destination and the character string included in the IP address of the connection destination is great, and may collect the discrepancy as the characteristic information.

Some examples of "the certain operation" explained above may be the change of the output destination by the output section 250, and the background output by the output section 250. Other examples of the characteristic information showing the characteristics of the operational pattern of the output section 250 include a time interval at which the output section 250 communicates.

The output destination of the data which is one of the characteristics of the operational pattern may include the mail address, the IP address, and the URL to which the output section 250 attempted to output the data when the characteristic information of the output section 250 was judged to satisfy the abnormal condition before.

The comparing section 264 compares the characteristic information received from the characteristic information collecting section 262 and the abnormal conditions stored in the terminal condition storage section 270. The abnormal condition indicates at least one of the characteristic of the data outputted from the output section when the user terminal is infected with malware and the characteristic of the operational pattern of the output section when the user terminal is infected with malware. When the characteristic information received from the characteristic information collecting section 262 satisfies the abnormal condition stored in the terminal condition storage section 270, the comparing section 264 notifies the deciding section 266 thereof.

The characteristic of the data outputted from the output section 250 when the user terminal 110 is infected with malware may be an example of the characteristic of the data outputted from the output section 250 by means of malicious software. The characteristic of the operational pattern of the output section 250 when the user terminal 110 is infected with malware may be an example of the characteristic of the operational pattern of the output section 250 when the user terminal 110 is infected with malware. Some examples of the abnormal condition are whether certain fields in the header of the outputted data are used or not, whether the identification numeral of the process attempting to output data, the domain name or the IP address of the transmission destination of the outputted data contains a certain character string, and the degree of matching between the domain name or the IP address of the connection destination and the domain name or the IP address of the transmission destination of the outputted data.

When the characteristic information received from the characteristic information collecting section 262 does not satisfy the abnormal conditions stored in the terminal condition storage section 270, the comparing section 264 may receive abnormal condition stored in the rating server 120, and compare the characteristic information received from the characteristic information collecting section 262 and the abnormal condition received from the rating server 120. When the characteristic information received from the characteristic information collecting section 262 satisfies the abnormal condition received from the rating server 120, the comparing section 264 notifies the deciding section 266 thereof.

The comparing section 264 may compare the characteristic information received from the characteristic information collecting section 262 with the normal conditions stored in the storage condition storage section 270. The normal condition indicates at least one of the characteristic of the data outputted from the output section 250 when the user terminal is not infected with malware and the characteristic of the operational pattern of the output section 250 when the user terminal is not infected with malware. When the characteristic information received from the characteristic information collecting section 262 satisfies the normal condition stored in the terminal condition storage section 270, the comparing section 264 notifies the deciding section 266 thereof.

The characteristic of the data outputted from the output section 250 when the user terminal 110 is not infected with malware may be an example of the characteristic of the data outputted from the output section 250 by means of software other than malicious software. The characteristic of the operational pattern of the output section 250 when the user terminal 110 is not infected with malware may be an example of the characteristic of the operational pattern of the output section 250 when the user terminal 110 is not infected with malware. Some examples of the abnormal condition are whether certain fields in the header of the outputted data are used or not, whether the identification numeral of the process attempting to output data, the domain name or the IP address of the transmission destination of the outputted data contains a certain character string, and the degree of matching between the domain name or the IP address of the connection destination and the domain name or the IP address of the transmission destination of the outputted data.

When the characteristic information received from the characteristic information collecting section 262 does not satisfy the normal conditions stored in the terminal condition storage section 270, the comparing section 264 may receive normal condition stored in the rating server 120, and compare the characteristic information received from the characteristic information collecting section 262 and the normal condition received from the rating server 120. When the characteristic information received from the characteristic information collecting section 262 satisfies the normal condition received from the rating server 120, the comparing section 264 notifies the deciding section 266 thereof.

The comparing section 264 may inquire the user whether to output the data, when the characteristic information received from the characteristic information collecting section 262 does not satisfy any of the abnormal conditions and the normal conditions stored in at least one of the terminal condition storage section 270 and the rating server 120. The comparing section 264 may inquire the user whether to output the data, when the characteristics of the data outputted from the output section 250 does not satisfy any of the abnormal condition and the normal condition stored in at least one of the terminal condition storage section 270 and the rating server 120. The comparing section 264 may inquire the user whether to output the data, when the characteristic of the operational pattern of the output section 250 does not satisfy any of the abnormal condition and the normal condition stored in at least one of the terminal condition storage section 270 and the rating server 120.

The comparing section 264 may display a screen for inquiring whether to output the data on the display section 222. When the user inputs either an instruction to prohibit output of the data or an instruction to permit output of the data to the input section 224, the output control section 260 receives the instruction, and controls the output section 250 based on the received instruction.

The comparing section 264 may display the screen for inquiring whether to output the data, for each piece of characteristic information received from the characteristic information collecting section 262. When the user inputs either an instruction to prohibit output of the data or an instruction to permit output of the data to the input section 224, the output control section 260 receives the instruction, and controls the information of the terminal condition storage section 270 based on the received instruction.

In an attempt to confirm that the user has actually browsed the display on the display section 222, the comparing section 264 may cause the display section 222 to display a screen showing a deformed character string, and prompting a user to input the character string. The comparing section 264 may cause the display section 222 to display a screen showing a figure, and prompting a user to input the noun representing the figure. The output control section 260 may confirm the character string inputted to the input section 224, and may receive the instruction from the user if the correct character string is confirmed to have been inputted. According to this arrangement, the validity of the user's instruction can be confirmed. In addition, the arrangement prevents automatic data output from malware or the like.

The comparing section 264 may cause the display section 222 to display warning when the characteristic of the data outputted from the output section 250 does not satisfy any of the abnormal condition and the normal condition stored in at least one of the terminal condition storage section 270 and the rating server 120. The comparing section 264 may cause the display section 222 to display warning when the characteristic of the operational pattern of the output section 250 does not satisfy any of the abnormal condition and the normal condition stored in at least one of the terminal condition storage section 270 and the rating server 120.

The character string included in the abnormal condition and the normal condition may be divided into a plurality of character strings, and each of the plurality of character strings may be assigned a weight factor. When judging whether the characteristic information satisfies the abnormal condition or the normal condition or whether the characteristic information matches the abnormal condition or the normal condition, the comparing section 264 may divide the character string into a plurality of pieces, and compare thus divided pieces to the abnormal condition or the normal condition correspondingly divided into pieces.

The comparing section 264 may judge whether the characteristic information satisfies the abnormal condition or the normal condition, or whether the characteristic information matches the abnormal condition or the normal condition, based on the weight factor of the matched character string. The comparing section 264 may calculate the summation of the weight factors of the matched character strings, and when the obtained value exceeds a predetermined value, the comparing section 264 may determine that the characteristic information satisfies the abnormal condition or the normal condition, or the characteristic information matches the abnormal condition or the normal condition. The above-described comparison may be performed by comparing the hash values of the character strings.

The abnormal condition and the normal condition may be stored in association with the identification numeral of software representing the characteristic information. Accordingly, the comparing section 264 can either identify or presume the software that is about to output data.

The deciding section 266 decides whether to prohibit the output section 250 from outputting data to outside of the output control system 100. The deciding section 266 may decide whether to prohibit the output section 250 from outputting data to outside of the output control system 100, based on the notification received from the comparing section 264.

The deciding section 266 may prohibit output of data upon reception of a notification indicating that at least one of the characteristic of the data to be outputted from the output section 250 and the characteristic of the operational pattern of the output section 250 satisfies the abnormal condition. The deciding section 266 may prohibit output of data when the data to be outputted from the output section 250 satisfies an abnormal data condition. The abnormal data condition represents the characteristic of the data outputted from the output section when the user terminal 110 is infected with malware. The deciding section 266 may prohibit output of data when the data to be outputted form the output section 250 satisfies an abnormal operational condition. The abnormal operational condition represents the characteristic of the operational pattern of the output section that results when the user terminal 110 is infected with malware.

The deciding section 266 may permit output of data upon reception of a notification indicating that at least one of the characteristic of the data to be outputted from the output section 250 and the characteristic of the operational pattern of the output section 250 satisfies the normal condition. The deciding section 266 may permit output of data when the data to be outputted from the output section 250 satisfies a normal data condition. The normal data condition represents the characteristic of the data outputted from the output section when the user terminal 110 is not infected with malware. The deciding section 266 may permit output of data when the data outputted form the output section 250 satisfies a normal operational condition. The normal operational condition represents the characteristic of the operational pattern of the output section when the user terminal 110 is not infected with malware.

To each of the plurality of abnormal conditions, a weight to be assigned when the characteristic information satisfies the abnormal condition may be set. To each of the plurality of normal conditions, a weight to be assigned when the characteristic information satisfies the normal condition may be set. A weight may be set to either a specific abnormal condition or a specific normal condition. The deciding section 266 may receive, from the comparing section 264, information regarding the type of the abnormal condition or the normal condition which the characteristic information collected by the characteristic information collecting section 262 satisfies.

The deciding section 266 may calculate at least one of the evaluation value regarding the characteristic information satisfying the normal condition and the evaluation value regarding the characteristic information satisfying the abnormal condition, based on the information received from the comparing section 264. The deciding section 266 may calculate the summation of the weights set to the abnormal conditions that the characteristic information collected by the characteristic information collecting section 262 satisfies, as the evaluation value regarding the characteristic information satisfying the abnormal condition. The deciding section 266 may calculate the summation of the weights set to the normal conditions that the characteristic information collected by the characteristic information collecting section 262 satisfies, as the evaluation value regarding the characteristic information satisfying the normal condition.

The deciding section 266 may decide whether to prohibit the output section 250 from outputting data to outside of the output control system 100, based on at least one of the evaluation value regarding the characteristic information satisfying the normal condition and the evaluation value regarding the characteristic information satisfying the abnormal condition. Accordingly, even when there is characteristic information satisfying both of the abnormal condition and the normal condition in the characteristic information collected by the characteristic information collecting section 262, or when a part of the plurality of pieces of characteristic information collected by the characteristic information collecting section 262 satisfy the abnormal condition and the rest of the plurality of pieces of characteristic information satisfy the normal condition, the deciding section 266 may still be able to decide whether to output data.

When the evaluation value regarding the characteristic information satisfying the abnormal condition is equal to or larger than a predetermined value, the deciding section 266 may prohibit the output section 250 from outputting data to outside of the output control system 100. When the evaluation value regarding the characteristic information satisfying the normal condition is equal to or larger than a predetermined value, the deciding section 266 may permit the output section 250 to output data to outside of the output control system 100.

When the evaluation value regarding the characteristic information satisfying the abnormal condition is equal to or larger than the evaluation value regarding the characteristic information satisfying the normal condition, the deciding section 266 may prohibit the output section 250 from outputting data to outside of the output control system 100. When the evaluation value regarding the characteristic information satisfying the normal condition is equal to or larger than the evaluation value regarding the characteristic information satisfying the abnormal condition, the deciding section 266 may permit the output section 250 to output data to outside of the output control system 100.

In the present embodiment, a summation of the weights set to the abnormal condition or the normal condition was explained above to be calculated as the evaluation value. In addition, whether to prohibit or permit outputting data was determined by determining which one of the evaluation value and the predetermined value is larger, and by determining which one of the evaluation value regarding the characteristic information satisfying the abnormal condition and the evaluation value regarding the characteristic information satisfying the normal condition is larger. However, the deciding section 266 is not limited to this configuration. For example, the deciding section 266 may calculate the evaluation value using the Bayesian function or SVM (Support Vector Machine). The deciding section 266 may execute the calculation method of the evaluation value and the deciding method of the evaluation selected by the user.

In the present embodiment, the deciding section 266 was explained to calculate at least one of the evaluation value regarding the characteristic information satisfying the normal condition and the evaluation value regarding the characteristic information satisfying the abnormal condition. However, the output control section 260 is not limited to this configuration. For example, the comparing section 264 may calculate at least one of the evaluation value regarding the characteristic information satisfying the normal condition and the evaluation value regarding the characteristic information satisfying the abnormal condition.

The deciding section 266 may receive a user instruction which the input section 224 has received, and control the output section 250 according to the user instruction. The deciding section 266 may update the information of the terminal condition storage section 270 based on the user instruction. The deciding section 266 may store the characteristic information received from the characteristic information collecting section 262 in association with the user instruction in the terminal condition storage section 270. The deciding section 266 may notify the rating server 120 of information in which the characteristic information received from the characteristic information collecting section 262 is associated with the user instruction.

The deciding section 266 may receive software's identification number either identified or presumed by the comparing section 264. The deciding section 266 may decide whether to prohibit the output section 250 from outputting data to outside of the output control system 100, based on the software's identification number.

The terminal condition storage section 270 stores an abnormal condition. The abnormal condition may include at least one of an abnormal data condition and an abnormal operational condition. The terminal condition storage section 270 may store a normal condition. The normal condition may include at least one of a normal data condition and a normal operational condition. The terminal condition storage section 270 may be a memory such as a ROM, a RAM, and a cache memory. The terminal condition storage section 270 may be a recording apparatus or a recording medium such as a hard disk, a CD-ROM, an IC card, and a flash memory.

The terminal condition storage section 270 may store at least one of an abnormal condition and a normal condition specific to each user terminal 110. For example, when an application developed independently by a user is installed in the user terminal 110, the terminal condition storage section 270 may store the abnormal condition and the normal condition specific to the application. The terminal condition storage section 270 may obtain at least one of the abnormal condition and the normal condition stored in the rating server 120. The terminal condition storage section 270 may obtain at least one of the abnormal condition and the normal condition stored in the rating server 120 on a regular basis.

In the present embodiment, the output control apparatus 240 was explained to be provided in the user terminal 110. However, the output control apparatus 240 is not limited to this configuration. The output control apparatus 240 may be provided in a router, a hub, a proxy server, Firewall, or a DMZ server that connect a plurality of user terminals 110 with the communication line 10. In such a case, the output control apparatus 240 may receive data which the user terminal 110 attempts to output to outside of the output control system 100 via the communication line 10, and decides whether to output the data to outside of the output control system 100.

Figure 3:
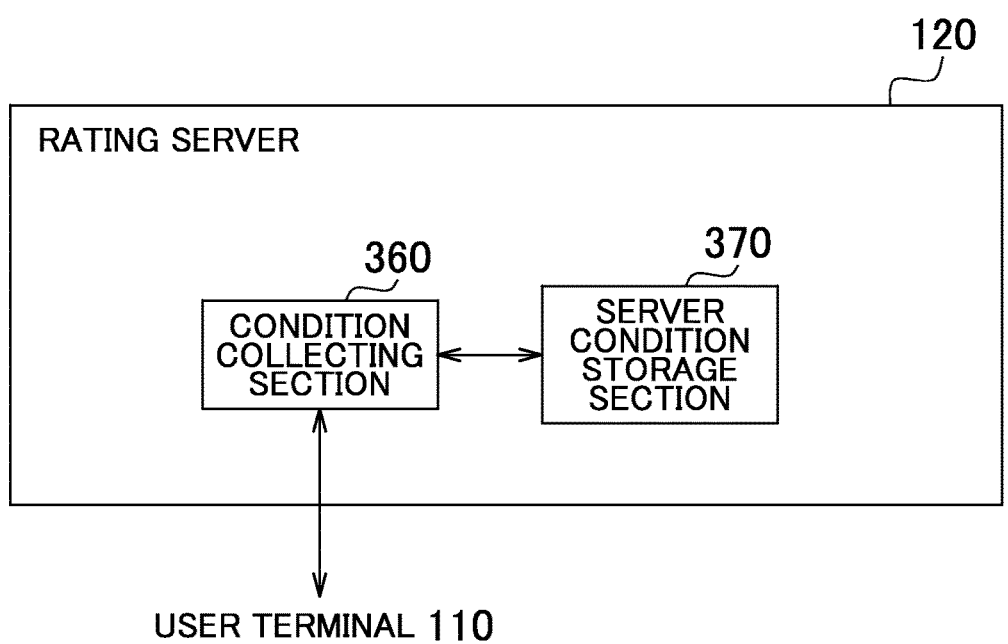
FIG. 3 schematically shows an exemplary system configuration of a rating server 120.

FIG. 3 schematically shows an exemplary system configuration of a rating server 120. The rating server 120 includes a condition collecting section 360 and a server condition storage section 370.

The condition collecting section 360 may collect, from a plurality of user terminals 110, at least one of the characteristics of the data outputted when they are infected with malware and the characteristics of the operational patterns when they are infected with malware. The condition collecting section 360 compares the collected characteristics with the abnormal conditions stored in the server condition storage section 370. When a collected characteristic does not match the abnormal conditions, the condition collecting section 360 stores the collected characteristic to the server condition storage section 370 as a new abnormal condition.

The condition collecting section 360 may compare the collected characteristic with the normal conditions stored in the server condition storage section 370. When a collected characteristic matches the normal condition, the condition collecting section 360 may judge that the characteristic is a general characteristic which is not an abnormal condition, or that the characteristic is a characteristic that has a possibility of matching both of a normal condition and an abnormal condition.

When the occurrence frequency of the characteristic having a possibility of matching both of the normal condition and the abnormal condition has become greater than a predetermined value, the condition collecting section 260 may store the characteristic in the server condition storage section 370 as a new abnormal condition. The occurrence frequency may be a number of times the certain characteristic is detected during a predetermined period, or by the time until the operational time of the user terminal 110 or the operational time of the software passes a predetermined time. When the occurrence frequency of a characteristic having the possibility of matching both of the abnormal condition and the normal condition has become lower than a predetermined value after the characteristic is stored in the server condition storage section 370, the condition collecting section 360 may judge that the characteristic is not an abnormal condition and delete the characteristic from the server condition storage section 370.

The condition collecting section 360 may collect, from a plurality of user terminals 110, at least one of the characteristic of the data outputted when they are not infected with malware and the characteristic of the operational pattern when they are not infected with malware. The condition collecting section 360 compares the collected characteristics with the normal conditions stored in the server condition storage section 370. When a collected characteristic does not match the normal condition, the condition collecting section 360 may store the collected characteristic in the server condition storage section 370 as a new normal condition.

The condition collecting section 360 may compare the collected characteristics with the abnormal conditions stored in the server condition storage section 370. When a collected characteristic does not match the abnormal condition, the condition collecting section 360 may determine that the collected characteristic is a general characteristic which is not a normal condition, or that the collected characteristic is a characteristic that has a possibility of matching both of a normal condition and an abnormal condition.

When the occurrence frequency of the characteristic having a possibility of matching both of the normal condition and the abnormal condition has become greater than a predetermined value, the condition collecting section 260 may store the characteristic in the server condition storage section 370 as a new normal condition. When the occurrence frequency of a characteristic having the possibility of matching both of the abnormal condition and the normal condition has become lower than a predetermined value after the characteristic is stored in the server condition storage section 370, the condition collecting section 360 may judge that the characteristic is not a normal condition and delete the characteristic from the server condition storage section 370.

The condition collecting section 360 may notify each of the plurality of user terminals 110 of at least one of the abnormal condition and the normal condition stored in the server condition storage section 370 either when a new abnormal condition or a new normal condition is stored in the server condition storage section 370 or on a regular basis. The server condition storage section 370 may be a memory such as a ROM, a RAM, and a cache memory. The server condition storage section 370 may be a recording apparatus or a recording medium such as a hard disk, a CD-ROM, an IC card, and a flash memory.

Figure 4:
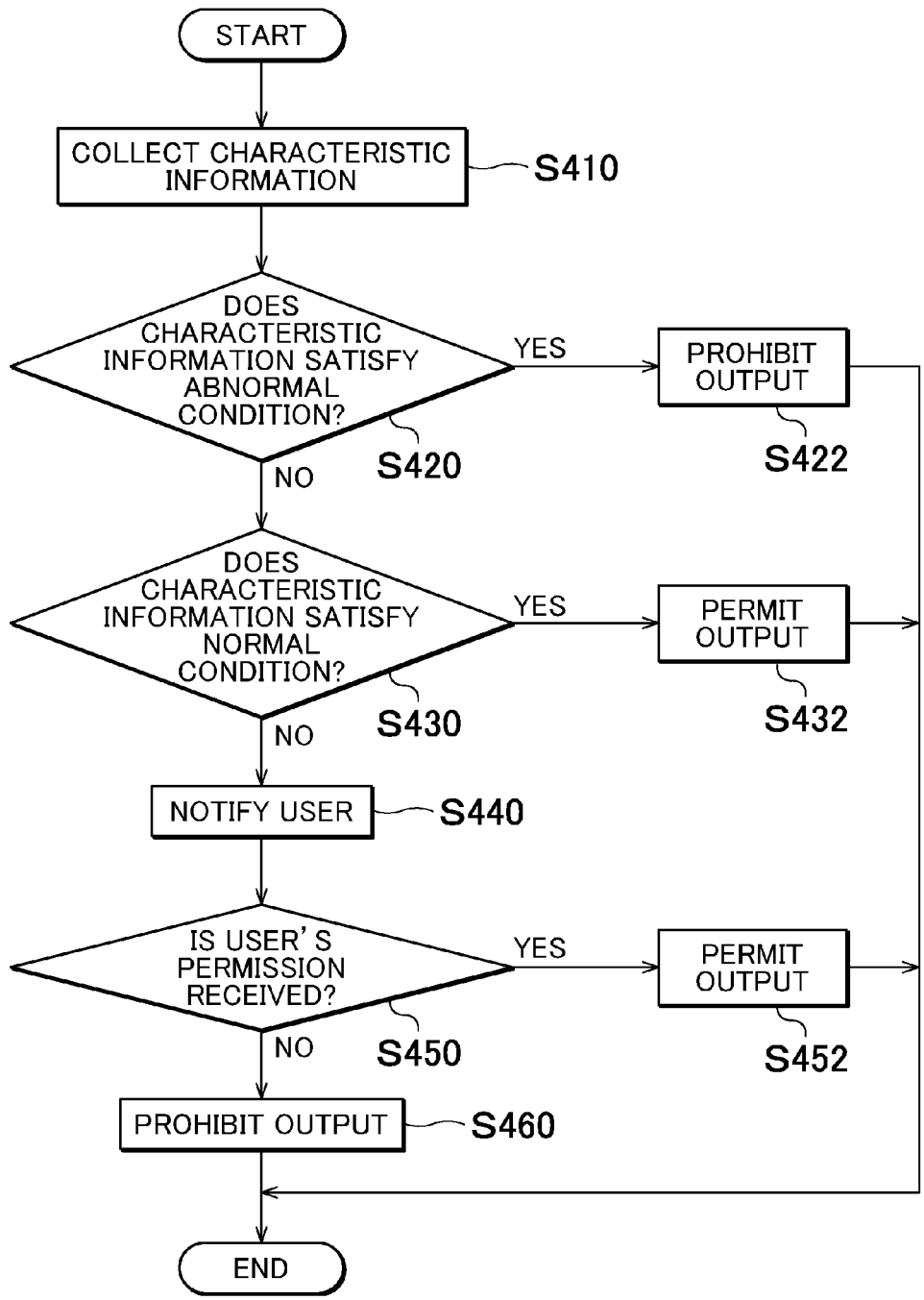
FIG. 4 schematically shows an exemplary output control method.

FIG. 4 schematically shows an exemplary output control method. In Step 410 (occasionally referred to as S410, the same rule may apply to the other steps too), the characteristic information collecting section 262 monitors the output section 250, and collects characteristic information. The characteristic information collecting section 262 notifies the comparing section 264 of the collected characteristic information.

In Step 420, the comparing section 264 compares the characteristic information received from the characteristic information collecting section 262 with the abnormal condition stored in the terminal condition storage section 270. When the characteristic information received from the characteristic information collecting section 262 satisfies the abnormal condition stored in the terminal condition storage section 270, the comparing section 264 notifies the deciding section 266 thereof in Step 422. The deciding section 266, upon receiving the notification from the comparing section 264, prohibits the output section 250 from outputting the data to outside. In this case, the output section 250 does not output the data to outside.

When the characteristic information received from the characteristic information collecting section 262 does not satisfy the abnormal condition stored in the terminal condition storage section 270, the comparing section 264 then compares the characteristic information received from the characteristic information collecting section 262 with the normal condition stored in the terminal condition storage section 270 in Step 430. When the characteristic information received from the characteristic information collecting section 262 satisfies the normal condition stored in the terminal condition storage section 270, the comparing section 264 notifies the deciding section 266 thereof in Step 432. The deciding section 266, upon receiving the notification from the comparing section 264, permits the output section 250 to output the data to outside. In this case, the output section 250 outputs the data to outside.

When the characteristic information received from the characteristic information collecting section 262 does not satisfy the normal condition stored in the terminal condition storage section 270 either, the comparing section 264 notifies that the characteristic information received from the characteristic information collecting section 262 does not satisfy either the abnormal condition or the normal condition in and inquires the user whether to output the data (Step 440).

When the input section 224 has received a user instruction in Step 450, the deciding section 266 checks the validity of the user instruction. When the user instruction is valid, whether to output the data is decided according to the user instruction. When the deciding section 266 has received a user instruction which permits outputting of the data, the deciding section 266 permits the output section 250 to output the data to outside in Step 452. In this case, the output section 250 outputs the data to outside. When the deciding section 266 has received a user instruction which prohibits outputting of the data, the deciding section 266 prohibits the output section 250 from outputting the data to outside in Step 460. In this case, the output section 250 does not output the data to outside.

Note that in the present embodiment, the step to judge whether the characteristic information satisfies the abnormal condition was performed prior to the step to judge whether the characteristic information satisfies the normal condition. However, the output control method is not limited to this. It is also possible to perform the step to judge whether the characteristic information satisfies the normal condition prior to the step to judge whether the characteristic information satisfies the abnormal condition. It is also possible to perform only one of these steps.

Figure 5:
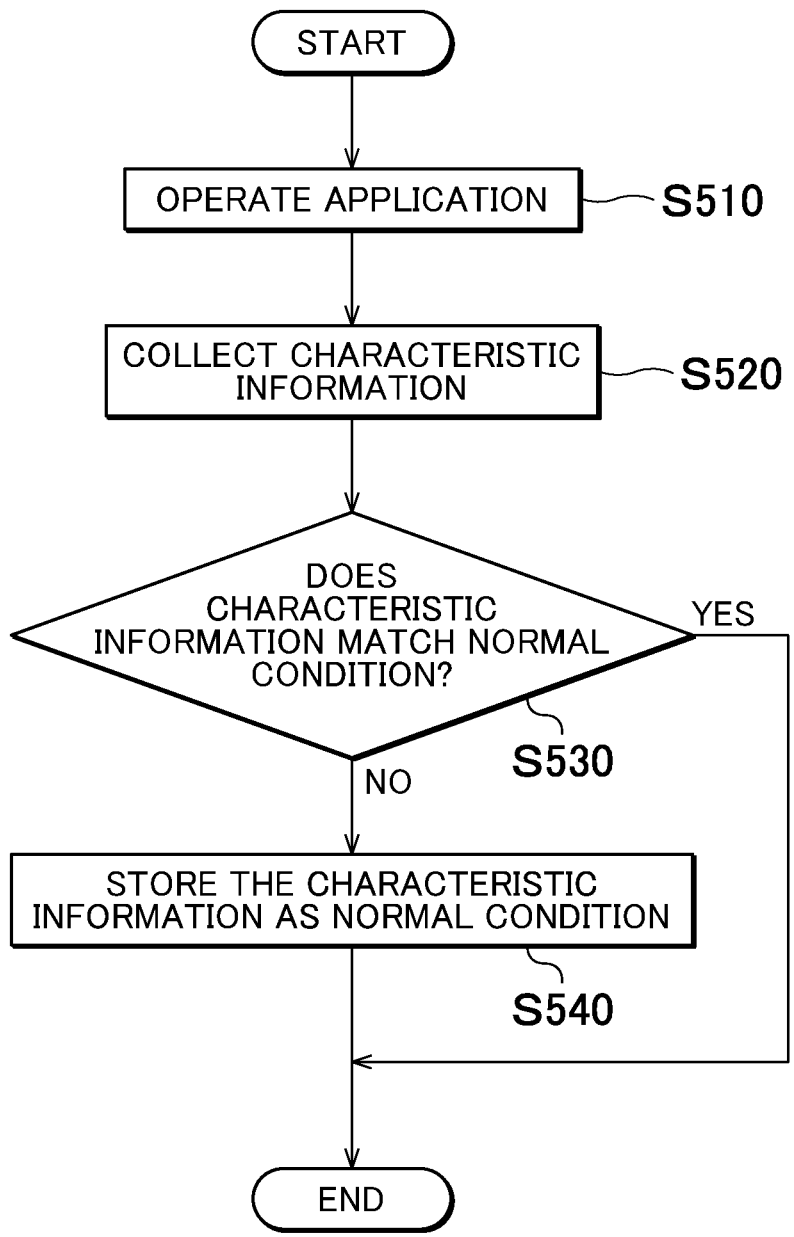
FIG. 5 schematically shows an exemplary condition collecting method.

FIG. 5 schematically shows an exemplary condition collecting method. FIG. 5 schematically shows an example of a method to collect normal conditions. In Step 510, trusted software such as an official application is operated on an information processing apparatus not infected with malware. For the purpose of simplifying the explanation, a condition collection method is explained in the context in which trusted software is operated on the user terminal 110. However, the condition collection method is not limited to this context. For example, the information processing apparatus on which the trusted software is operated may be a user terminal 110, or a rating server 120.

In Step 520, the characteristic information collecting section 262 collects the characteristic information of the output section 250. The characteristic information collecting section 262 notifies the comparing section 264 of the collected characteristic information. In Step 530, the comparing section 264 compares the characteristic information received from the characteristic information collecting section 262 with the normal conditions stored in the terminal condition storage section 270. When the characteristic information received from the characteristic information collecting section 262 does not match the normal conditions stored in the terminal condition storage section 270, the comparing section 264 stores the collected characteristic in the terminal condition storage section 270 as a new normal condition in Step 540. This configuration helps reduce the expense and time required to collect characteristic information.

The comparing section 264 may store the collected characteristic in the terminal condition storage section 270 in association with the identification numeral of the operating software. Accordingly, it becomes possible to identify or presume the type of software that is about to output data based on the characteristic information of the output section 250.

Note that in the present embodiment, the comparing section 264 was explained to compare the characteristic information received from the characteristic information collecting section 262 with the normal conditions stored in the terminal condition storage section 270. However the condition collection method is not limited to such. For example, the comparing section 264 may compare the characteristic information received from the characteristic information collecting section 262 with the normal conditions stored in the server condition storage section 370.

FIG. 6 schematically shows an exemplary condition collecting method. FIG. 6 schematically shows an example of a method to collect at least one of the normal condition and the abnormal condition specific to each of the user terminals 110. In Step 610, after at least confirming that the user terminal 110 is not infected with any known malware, the user terminal 110 is allowed to execute various operations. For example, the user terminal 110 is allowed to execute an application developed independently by the user and installed in the user terminal 110.

In Step 620, the characteristic information collecting section 262 collects the characteristic information of the output section 250. The characteristic information collecting section 262 notifies the comparing section 264 of the collected characteristic information. In Step 630, the comparing section 264 compares the characteristic information received from the characteristic information collecting section 262 with the abnormal conditions and the normal conditions stored in the terminal condition storage section 270.

When the characteristic information received from the characteristic information collecting section 262 does not match any of the abnormal condition and the normal condition stored in the terminal condition storage section 270, the comparing section 264 displays the characteristic information that does not match any of the abnormal conditions and the normal conditions on the display section 222 in Step 640, and inquires the user whether to output the data when the output section 250 has exhibited this characteristic. When the input section 224 has received the user instruction, the deciding section 266 checks the validity of the user instruction. When the user instruction is valid, the deciding section 266 associates the collected characteristic information with whether to output the data.

In Step 640, for each piece of characteristic information that does not match either the abnormal condition or the normal condition, it is judged whether the user instruction is prohibiting the data output. When the judgment results in the positive, the deciding section 266 stores the characteristic information in the terminal condition storage section 270 as a new abnormal condition in Step 642.

When the user instruction regarding the characteristic information is not prohibiting the data output, the deciding section 266 judges whether the user instruction is permitting the data output in Step 650. When the judgment results in the positive, the deciding section 266 stores the characteristic information in the terminal condition storage section 270 as a new normal condition in Step 652. This configuration helps reduce the expense and time required to collect characteristic information.

Note that in the present embodiment, the step to judge whether the user instruction is prohibiting the data output is performed prior to the step to judge whether the user instruction is permitting the data output. However, the condition collecting method is not limited to this.

For example, the step to judge whether the user instruction is prohibiting the data output may be performed after the step to judge whether the user instruction is permitting the data output. Alternatively, whether the user instruction is prohibiting the data output and whether the user instruction is permitting the data output may be judged in a single step. It is also possible to perform only one of the step to judge whether the user instruction is prohibiting the data output and the step to judge whether the user instruction is permitting the data output.

Figure 7:
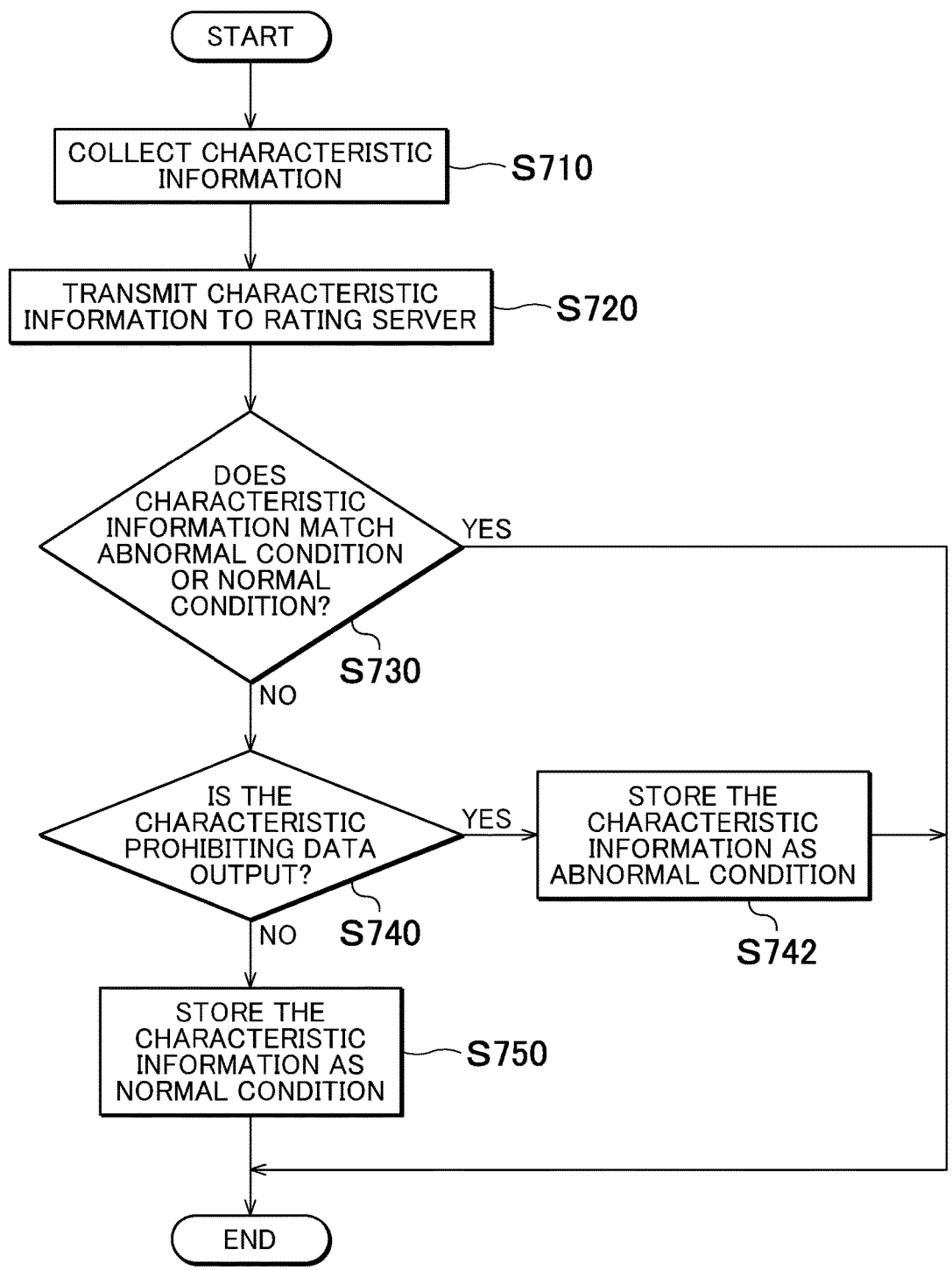
FIG. 7 schematically shows an exemplary condition collecting method.

FIG. 7 schematically shows an exemplary condition collecting method. FIG. 7 shows another example of the condition collecting methods explained with reference to FIG. 5 or FIG. 6. In Step 710, the characteristic information collecting section 262 monitors the output section 250 and collects the characteristic information.

In Step 720, the characteristic information collecting section 262 transmits the collected characteristic information to the rating server 120. In Step 730, the condition collecting section 360 of the rating server 120 receives characteristic information from the characteristic information collecting section 262, and compares the characteristic information received from the characteristic information collecting section 262 with at least one of the abnormal condition and the normal condition stored in the server condition storage section 370.

When the characteristic information received from the characteristic information collecting section 262 does not match either the abnormal condition or the normal condition stored in the server condition storage section 370, the condition collecting section 360 judges whether the user instruction is prohibiting the data output, for each piece of characteristic information that does not match either the abnormal condition or the normal condition (Step 740). For example, the characteristic information that does not match either the abnormal condition or the normal condition is displayed on the display section 222, to inquire the user whether to output the data when the output section 250 has exhibited the characteristic.

When the user instruction regarding certain characteristic information is prohibiting the data output, the condition collecting section 360 stores the characteristic information in the server condition storage section 370 as a new abnormal condition in Step 742. When the user instruction regarding the characteristic information is not prohibiting the data output, the condition collecting section 360 stores the characteristic information in the server condition storage section 370 as a new normal condition in Step 750. This configuration helps reduce the expense and time required to collect characteristic information.

Note that in the present embodiment, only the step to judge whether the user instruction is prohibiting the data output was performed. However, the condition collecting method is not limited to such. For example, both of the step to judge whether the user instruction is prohibiting the data output and the step to judge whether the user instruction is permitting the data output may be performed.

Figure 8:
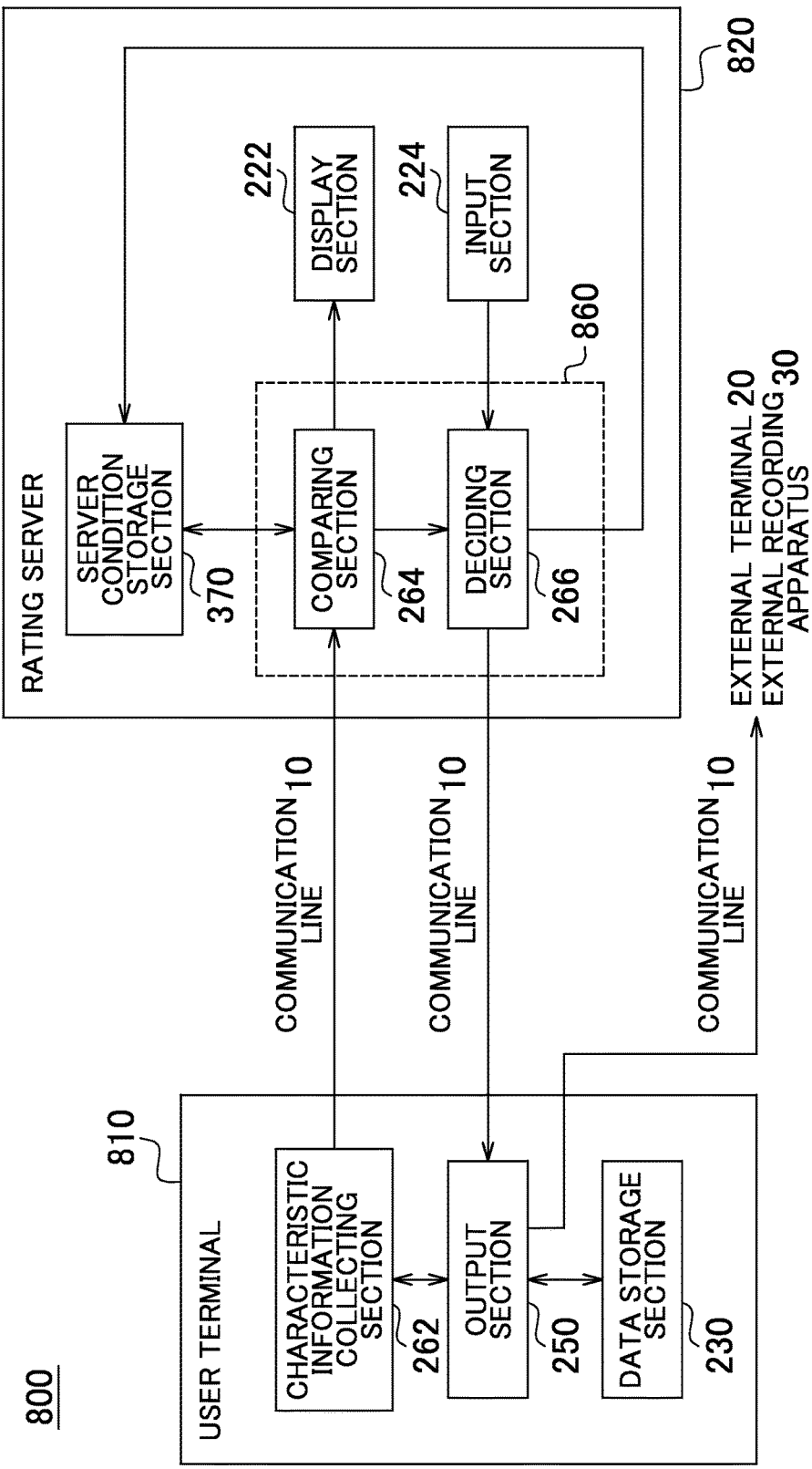
FIG. 8 schematically shows an exemplary system configuration of an output control system 800.

FIG. 8 schematically shows an exemplary system configuration of an output control system 800. The output control system 800 includes a user terminal 810 and a rating server 820. The user terminal 810 includes a data storage section 230, an output section 250, and a characteristic information collecting section 262. The rating server 820 includes a display section 222, an input section 224, an output control section 860, and a server condition storage section 370. Each section of the output control system 800 that is the same as or similar to the counterpart of the output control system 100 is assigned the same reference numeral, and the overlapping explanation is omitted in the following.

The output control system 800 is different from the output control system 100 in that the output control section 860 controls the output section 250 via the communication line 10. The output control system 800 is different from the output control system 100 in that the output section 250 receives the decision of the deciding section 266 via the communication line 10. The output control system 800 is different from the output control system 100 in that the characteristic information collecting section 262 notifies the comparing section 264 of the collected characteristic information via the communication line 10.

Moreover, the output control system 800 is different from the output control system 100 in that the comparing section 264 compares the characteristic information received from the characteristic information collecting section 262 with at least one of the abnormal condition and the normal condition stored in the server condition storage section 370. The output control system 800 is different from the output control system 100 in that the deciding section 266 updates the server condition storage section 370. For the other configurations, the output control system 800 may be the same as the output control system 100.

Figure 9:
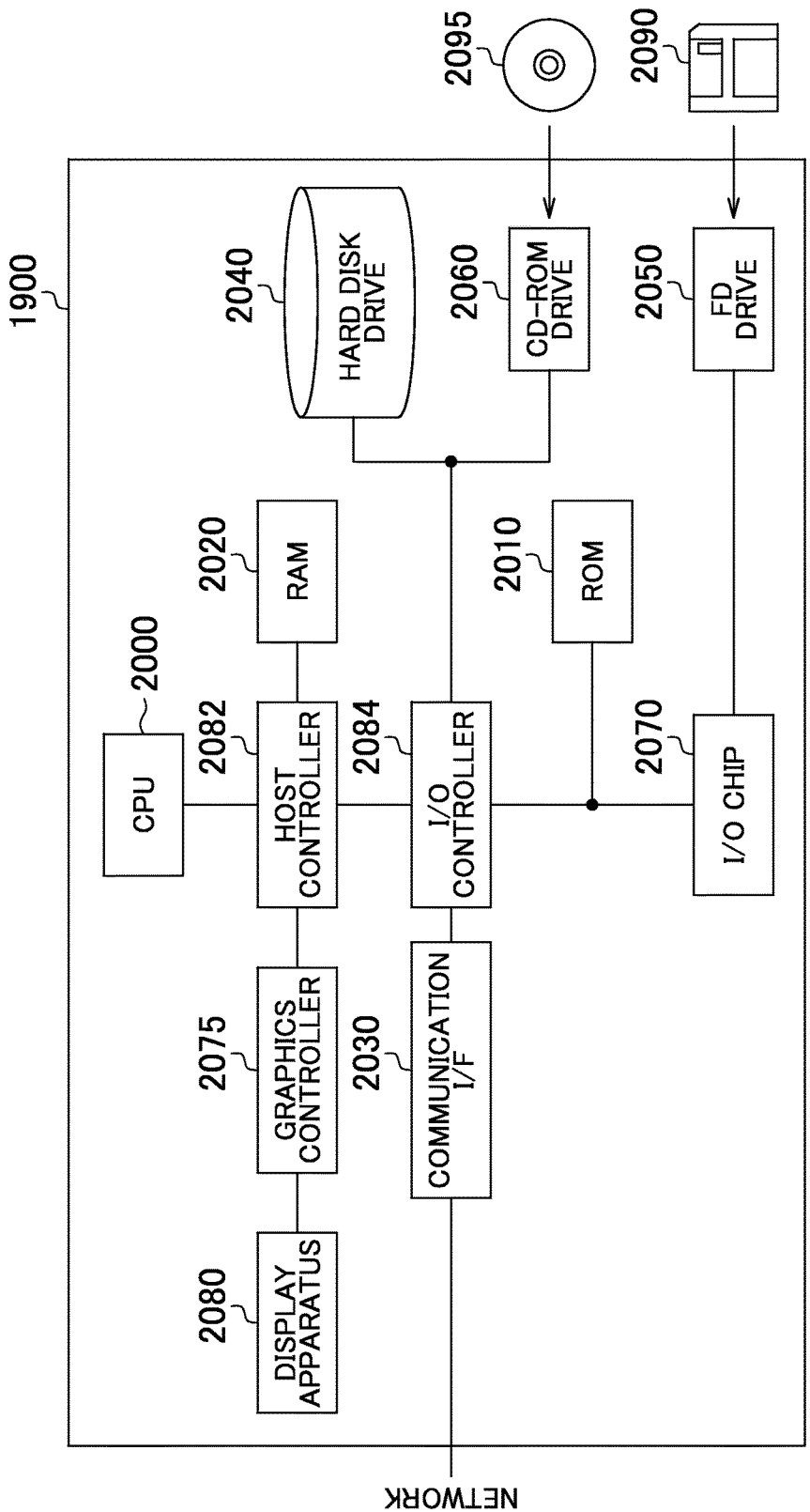
FIG. 9 schematically shows an exemplary hardware configuration of a computer 1900 according to an embodiment.

FIG. 9 schematically shows an exemplary hardware configuration of a computer 1900 according to the present embodiment. The computer 1900 according to the present embodiment is equipped with a CPU periphery that includes a CPU 2000, a RAM 2020, a graphics controller 2075, and a display apparatus 2080 which are mutually connected by a host controller 2082. The computer 1900 is also equipped with an input/output unit having a communication interface 2030, a hard disk drive 2040, and a CD-ROM drive 2060 which are connected to the host controller 2082 via an input/output controller 2084, and a legacy input/output unit having a ROM 2010, a flexible disk drive 2050, and an input/output chip 2070 which are connected to the input/output controller 2084.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 or the like on a frame buffer provided in the RAM 2020, and causes the image data to be displayed on the display apparatus 2080. Alternatively, the graphics controller 2075 may contain therein a frame buffer for storing image data generated by the CPU 2000 or the like.

The input/output controller 2084 connects the host controller 2082 with the communication interface 2030, the hard disk drive 2040, and the CD-ROM drive 2060, which are relatively high-speed input/output apparatuses. The communication interface 2030 communicates with other apparatuses via a network. The hard disk drive 2040 stores a program and data used by the CPU 2000 within the computer 1900. The CD-ROM drive 2060 reads the program or the data from the CD-ROM 2095, and provides the hard disk drive 2040 with the program or the data via the RAM 2020.

The ROM 2010, and the flexible disk drive 2050 and the input/output chip 2070 which are relatively low-speed input/output apparatuses are connected to the input/output controller 2084. The ROM 2010 stores therein a boot program executed by the computer 1900 at the time of activation, a program depending on the hardware of the computer 1900, or the like. The flexible disk drive 2050 reads the programs or data from a flexible disk 2090, and provides the hard disk drive 2040 with the programs or data via the RAM 2020. The input/output chip 2070 connects a flexible drive 2050 to an input/output controller 2084, and connects various input/output apparatuses via a parallel port, a serial port, a keyboard port, a mouse port, and the like to the input/output controller 2084.

A program to be provided for the hard disk drive 2040 via the RAM 2020 is provided by a user by being stored in such a recording medium as the flexible disk 2090, the CD-ROM 2095, and an IC card. The program is read from the recording medium, installed into the hard disk drive 2040 within the computer 1900 via the RAM 2020, and executed in the CPU 2000.

For example when communication is performed between the computer 1900 and an external apparatus and the like, the CPU 2000 executes a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording apparatus such as a RAM 2020, a hard disk drive 2040, a flexible disk 2090, or a CD-ROM 2095, and transmits the read transmission data to a network, or writes reception data received from a network to a reception buffering region or the like provided on the recording apparatus. In this way, the communication interface 2030 may exchange transmission/reception data with the recording apparatus by a DMA (direct memory access) method, or by a configuration that the CPU 2000 reads the data from the recording apparatus or the communication interface 2030 of a transfer destination, to write the data into the communication interface 2030 or the recording apparatus of the transfer destination, so as to transfer the transmission/reception data.

In addition, the CPU 2000 causes all or a necessary portion of the file of the database to be read into the RAM 2020 such as by DMA transfer, the file or the database having been stored in an external recording apparatus such as the hard disk drive 2040, the CD-ROM drive 2060 (CD-ROM 2095), the flexible disk drive 2050 (flexible disk 2090), to perform various types of processing onto the data on the RAM 2020. The CPU 2000 then writes back the processed data to the external recording apparatus by means of a DMA transfer method or the like. In such processing, the RAM 2020 can be considered to temporary store the contents of the external recording apparatus, and so the RAM 2020, the external recording apparatus, and the like are collectively referred to as a memory, a storage section, or a recording apparatus, and so on in the present embodiment. In the present embodiment, various types of information such as various types of programs, data, tables, and databases are stored in the recording apparatus, to undergo information processing. Note that the CPU 2000 may also retain a part of the RAM 2020, to perform reading/writing thereto on the cache memory. In such an embodiment, too, the cache is considered to be contained in the RAM 2020, the memory, and/or the recording apparatus unless noted otherwise, since the cache memory performs part of the function of the RAM 2020.

The CPU 2000 performs various types of processing, onto the data read from the RAM 2020, which includes various types of operations, processing of information, condition judging, search/replace of information, described in the present embodiment and designated by an instruction sequence of programs, and writes the result back to the RAM 2020. For example, when performing condition judging, the CPU 2000 judges whether each type of variables shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 can search for information in the file or database or the like in the recording apparatus. For example when a plurality of entries, each having an attribute value of a first attribute is associated with an attribute value of a second attribute, are stored in a recording apparatus, the CPU 2000 searches for an entry matching the condition whose attribute value of the first attribute is designated, from among the plurality of entries stored in the recording apparatus, and reads the attribute value of the second attribute stored in the entry, thereby obtaining the attribute value of the second attribute associated with the first attribute satisfying the predetermined condition.

The above-explained program or module can be stored in an external recording medium. Exemplary recording medium include a flexible disk 2090, a CD-ROM 2095, as well as an optical recording medium such as a DVD or a CD, a magneto-optic recording medium such as a MO, a tape medium, and a semiconductor memory such as an IC card. In addition, a recording apparatus such as a hard disk or a RAM provided in a server system connected to a dedicated communication network or the Internet can be used as a recording medium, thereby providing the program to the computer 1900 via the network.

A program that is installed in the computer 1900 and causes the computer 1900 to function as each section of the output control system or the output control apparatus (i.e., the output section 250, the characteristic information collecting section 262, the comparing section 264, the deciding section 266, the terminal condition storage section 270, the condition collecting section 360, or the server condition storage section 370) includes modules defining the operations of respective sections. The program or module acts on the CPU 2000, to cause the computer 1900 to function as each section of the output control system or the output control apparatus.

The information processing described in these programs is read into the computer 1900, to function as concrete means as a result of cooperation between the software and the above-mentioned various types of hardware resources. Moreover, the output control system or the output control apparatus adapted for the usage (e.g., the output control system 100, the output control system 800, or the output control apparatus 240) is constituted by realizing the operation or processing of information in accordance with the usage of the computer 1900 of the present embodiment by these concrete means.

As described above, the present application describes a output control method including: storing, in a condition storage section, an abnormal condition showing at least one of a characteristic of data to be outputted from an output section by means of malicious software and a characteristic of an operational pattern of the output section that results when the malicious software outputs data; and comparing, with the abnormal condition, at least one of the characteristic of the data to be outputted from the output section and the characteristic of the operational pattern of the output section, and when at least one of the characteristic of the data to be outputted from the output section and the characteristic of the operational pattern of the output section satisfies the abnormal condition, prohibiting output of the data.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

REFERENCE NUMERALS

10: communication line, 20: external terminal, 30: external recording apparatus, 100: output control system, 110: user terminal, 120: rating server, 222: display section, 224: input section, 230: data storage section, 240: output control apparatus, 250: output section, 260: output control section, 262: characteristic information collecting section, 264: comparing section, 266: deciding section, 270: terminal condition storage section, 360: condition collecting section, 370: server condition storage section, 800: output control system, 810: user terminal, 820: rating server, 860: output control section, 1900: computer, 2000: CPU, 2010: ROM, 2020: RAM, 2030: communication interface, 2040: hard disk drive, 2050: flexible disk drive, 2060: CD-ROM drive, 2070: input/output chip, 2075: graphics controller, 2080: display apparatus, 2082: host controller, 2084: input/output controller, 2090: flexible disk, 2095: CD-ROM

What is claimed is:

1. An output control apparatus comprising:
    an output section that outputs data to outside;
    a condition storage section that stores an abnormal condition showing a characteristic of an operational pattern of the output section that results when malicious software outputs data and a normal condition showing a characteristic of an operational pattern of the output section that results when software other than the malicious software outputs data; and
    an output control section that controls output of data by the output section based on the likelihood that malicious software is responsible for the output by prohibiting output of data when a characteristic of an operational pattern of the output section satisfies the abnormal condition, permitting output of the data when the characteristic of the operational pattern of the output section satisfies the normal condition, and inquiring a user whether to output the data when the characteristic of the operational pattern of the output section does not satisfy either the abnormal condition or the normal condition, wherein
    the output control section confirms the validity of the user's instruction of whether to output the data, receives the user's instruction when the validity of the user's instruction is confirmed, and permits output of the data when the received user's instruction is to output the data.

2. A non-transitory computer-readable medium storing therein a program that causes a computer to function as an output control apparatus comprising:
    an output section that outputs data to outside;
    a condition storage section that stores an abnormal condition showing a characteristic of an operational pattern of the output section that results when malicious software outputs data and a normal condition showing a characteristic of an operational pattern of the output section that results when software other than the malicious software outputs data; and
    an output control section that controls output of data by the output section based on the likelihood that malicious software is responsible for the output by prohibiting output of data when a characteristic of an operational pattern of the output section satisfies the abnormal condition, permitting output of the data when the characteristic of the operational pattern of the output section satisfies the normal condition, and inquiring a user whether to output the data when the characteristic of the operational pattern of the output section does not satisfy either the abnormal condition or the normal condition, wherein
    the output control section confirms the validity of the user's instruction of whether to output the data, receives the user's instruction when the validity of the user's instruction is confirmed, and permits output of the data when the received user's instruction is to output the data.

3. An output control method comprising:
    storing, in a condition storage section, an abnormal condition showing a characteristic of an operational pattern of an output section that results when malicious software outputs data and a normal condition showing a characteristic of an operational pattern of the output section that results when software other than the malicious software outputs data; and
    controlling output of data based on the likelihood that malicious software is responsible for the output by:
    comparing, with the abnormal condition, a characteristic of an operational pattern of the output section, and when the characteristic of the operational pattern of the output section satisfies the abnormal condition, prohibiting output of the data;
    comparing, with the normal condition, the characteristic of the operational pattern of the output section, and when the characteristic of the operational pattern of the output section satisfies the normal condition, permitting output of the data;

inquiring a user whether to output the data when the characteristic of the operational pattern of the output section does not satisfy either the abnormal condition or the normal condition; and confirming the validity of the user's instruction, made in response to said inquiring, of whether to output the data, receiving the user's instruction when the validity of the user's instruction is confirmed, and permitting output of the data when the received user's instruction is to output the data.

4. An output control system comprising:
a server; and
a terminal that exchanges information with the server via a communication line, wherein
the terminal includes:
an output section that outputs data to outside; and
a characteristic information collecting section that collects characteristic information showing a characteristic of an operation of the output section, and transmits the characteristic information to the server, and
the server includes:
a condition storage section that stores an abnormal condition showing a characteristic of an operation of the output section that results when malicious software outputs data and a normal condition showing a characteristic of an operational pattern of the output section that results when software other than the malicious software outputs data; and
a deciding section that receives the characteristic information and controls output of the data based on the likelihood that malicious software is responsible for the output by deciding to prohibit output of the data when the characteristic information satisfies the abnormal condition, deciding to permit output of the data when the characteristic information satisfies the normal condition, deciding whether to prohibit or permit output of the data on the basis of inquiring a user whether to output the data when the characteristic information does not satisfy either the abnormal condition or the normal condition, and notifying the output section of the decision, wherein
the output section does not output the data to outside when having received the decision to prohibit the output of the data, and
the deciding section confirms the validity of the user's instruction of whether to output the data, receives the user's instruction when the validity of the user's instruction is confirmed, and permits output of the data when the received user's instruction is to output the data.

5. The output control apparatus according to claim 1, wherein
the characteristic of an operational pattern includes whether a user of a user terminal including the output control apparatus has indicated acceptance of an operation.

6. The output control method according to claim 3, wherein
the characteristic of an operational pattern includes whether a user of a user terminal performing the output control method has indicated acceptance of an operation.

7. The output control system according to claim 4, wherein
the characteristic of an operation of the output section includes whether a user of the terminal has indicated acceptance of an operation.

8. The output control apparatus according to claim 1, wherein
the characteristic of an operational pattern includes whether a user of a user terminal including the output control apparatus has indicated acceptance of a change in the output destination of the data or a background output by the output section.

9. The output control method according to claim 3, wherein
the characteristic of an operational pattern includes whether a user of a user terminal performing the output control method has indicated acceptance of a change in the output destination of the data or a background output by the output section.

10. The output control system according to claim 4, wherein
the characteristic of an operation of the output section includes whether a user of the terminal has indicated acceptance of a change in the output destination of the data or a background output by the output section.

11. The output control apparatus according to claim 1, wherein
the characteristic of an operational pattern includes the output destination of the data.

12. The output control apparatus according to claim 1, wherein
the characteristic of an operational pattern includes whether a URL, domain name, or IP address of a site in communication with a user terminal including the output control apparatus matches a URL, domain name, or IP address of a site that is the intended destination of the data.

13. The non-transitory computer-readable medium according to claim 2, wherein
the characteristic of an operational pattern includes whether a user of a user terminal including the output control apparatus has indicated acceptance of an operation.

14. The non-transitory computer-readable medium according to claim 2, wherein
the characteristic of an operational pattern includes whether a user of a user terminal including the output control apparatus has indicated acceptance of a change in the output destination of the data or a background output by the output section.

15. The non-transitory computer-readable medium according to claim 2, wherein
the characteristic of an operational pattern includes the output destination of the data.

16. The non-transitory computer-readable medium according to claim 2, wherein
the characteristic of an operational pattern includes whether a URL, domain name, or IP address of a site in communication with a user terminal including the output control apparatus matches a URL, domain name, or IP address of a site that is the intended destination of the data.

17. The output control method according to claim 3, wherein
the characteristic of an operational pattern includes the output destination of the data.

18. The output control method according to claim 3, wherein
the characteristic of an operational pattern includes whether a URL, domain name, or IP address of a site in communication with a user terminal performing the output control method matches a URL, domain name, or IP address of a site that is the intended destination of the data.

19. The output control system according to claim 4, wherein
the characteristic of an operation of the output section includes the output destination of the data.

20. The output control system according to claim 4, wherein
the characteristic of an operation of the output section includes whether a URL, domain name, or IP address of a site in communication with the terminal matches a URL, domain name, or IP address of a site that is the intended destination of the data.

\* \* \* \* \*